United States Patent [19]
Holz

[11] Patent Number: 5,347,360
[45] Date of Patent: Sep. 13, 1994

[54] RING LASER GYRO

[75] Inventor: Michael Holz, Newton Centre, Mass.

[73] Assignee: Ratheon Company, Lexington, Mass.

[21] Appl. No.: 415,924

[22] Filed: Sep. 13, 1989

Related U.S. Application Data

[63] Continuation of Ser. No. 948,426, Dec. 31, 1986, abandoned, which is a continuation of Ser. No. 412,442, Aug. 27, 1982, abandoned.

[51] Int. Cl.$^5$ .................... G01B 9/02; G01C 19/64
[52] U.S. Cl. .................................. 356/350; 372/94

[56] References Cited

U.S. PATENT DOCUMENTS

| | | | |
|---|---|---|---|
| 3,503,005 | 3/1970 | Olocker | 372/94 |
| 3,642,373 | 2/1972 | Cathern | 372/94 |
| 3,744,908 | 7/1973 | Podgorski | 356/350 |
| 4,325,033 | 4/1982 | Shutt | 356/350 |
| 4,397,027 | 8/1983 | Zampiello et al. | 356/350 |
| 4,470,701 | 9/1984 | Smith | 372/94 |
| 4,481,635 | 11/1984 | Broberg et al. | 372/94 |
| 4,653,919 | 3/1987 | Stjern et al. | 356/350 |
| 4,667,162 | 5/1987 | Broberg et al. | 330/4.3 |

FOREIGN PATENT DOCUMENTS 2072936 10/1981 United Kingdom ............. 356/350

OTHER PUBLICATIONS

Smith et al.; "Ring Lasers: Principles and Applications"; '68–'69; pp. 38–42; Proc. Instr. Mech. Engrs., vol. 183 p. 130.

Podgorski et al., "Langmuir Flow Effects in the Laser Gyro", Jan. 1968, pp. 11–18, IEEE Jour. Quant. Elect., vol. QE-4, #1.

Optical Engineering/vol. 18 No. 4/Jul.–Aug. 1979"Dispersion and Gas Flow Effects in the Ring Laser Gyro" F. Aronowitz and W. L. Lim, pp. 376–380.

*Primary Examiner*—Nelson Moskowitz
*Attorney, Agent, or Firm*—Walter F. Dawson; Richard M. Sharkansky

[57] ABSTRACT

A ring laser gyro uses means for shaping the gas flow, which inevitably develops as a result of a DC discharge, to optimize the effect of the Fresnel-Fizeau drag on the output signal of the gyro. In one embodiment, a sufficient component of the gain medium flow is provided to produce a substantially constant Fresnel-Fizeau component of the output signal even in the presence of variations of the discharge current. In another embodiment, a sufficient component of gain medium flow is provided to substantially eliminate the Fresnel-Fizeau component of the output signal at a predetermined level of discharge current.

9 Claims, 3 Drawing Sheets

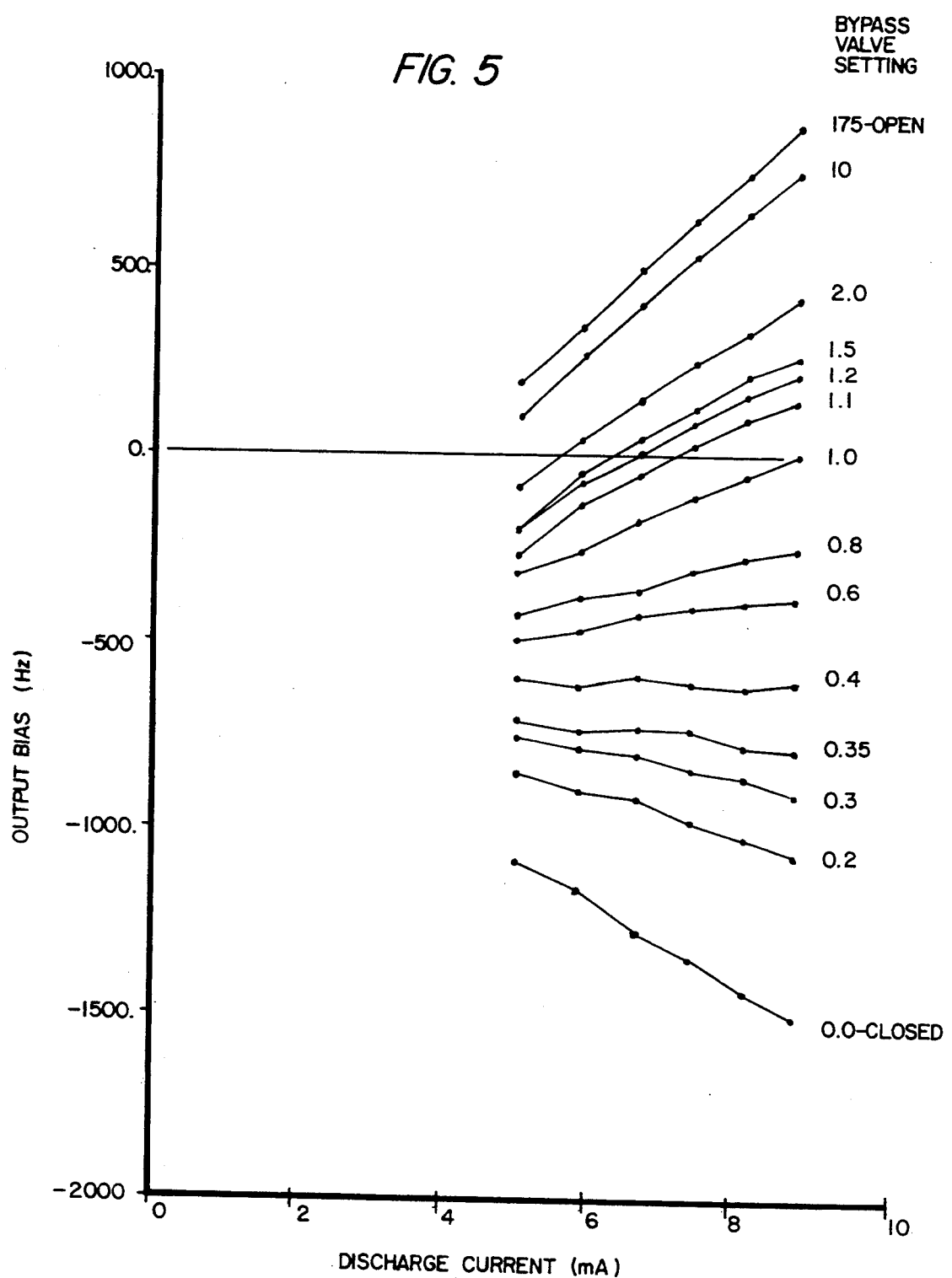

5,347,360

RING LASER GYRO

This is a continuation of Ser. No. 948,426, filed Dec. 31, 1986, now abandoned, which is a continuation of Ser. No. 412,442, filed Aug. 27, 1982, now abandoned.

BACKGROUND OF THE INVENTION

Ring laser gyros use two counter-propagating beams of predetermined frequencies to measure the rotation rate about the sensitive axis of the ring as a function of the difference in frequency, i.e. the beat frequency, between the counter-propagating beams. The means normally used to produce such counter-propagating beams usually comprises an electric DC discharge in a gain medium, such as a suitable mixture of Helium and Neon. The electrical discharge gives rise to the so-called wall effect first explained by Langmuir. The discharge results in a negatively charged wall region which attracts positive neon ions but repels electrons. This causes an unbalanced electron pressure in that region which gives rise to a net force on the atoms of the gain medium which, in turn, drives a gas flow, customarily called Langmuir flow. Thus, in all presently known laser gyros, the gain medium is subject to a corresponding Langmuir flow. The interaction of the beams with the moving medium, normally referred to as the Fresnel-Fizeau drag, gives rise to a frequency shift of the counter-propagating beams, since the beam propagating in the direction of the flow sees an optical length which is different from that of the beam propagating in the direction opposite that of the flow. The flow then gives rise to a beat frequency between the counter-propagating beams which is not due to the rotation of the ring path, thus the output signal has a component which is normally referred to as the Fresnel-Fizeau bias. Present gyro configurations use two balanced electrical discharges in the two opposite directions in order to cancel the Fresnel-Fizeau bias. The main problem is that if the two electrical discharges are not perfectly balanced or if the two discharge bores are not perfectly matched, there is still a net bias due to the unbalanced Fresnel-Fizeau drag.

SUMMARY OF THE INVENTION

The invention provides for a ring laser gyro using means for shaping the gain medium flow in order to optimize the effect of the Fresnel-Fizeau drag on the output signal of the gyro. In one embodiment, the laser gyro provides a sufficient component of gain medium flow to produce a substantially constant Fresnel-Fizeau component of the output signal as the current, which is used to produce the counter-propagating beams, varies from its nominal value. In another embodiment, the laser gyro provides a sufficient component of gain medium flow to substantially eliminate the Fresnel-Fizeau component of the output signal for a predetermined value of the discharge current.

The invention is not limited to four-frequency gyros using Faraday rotators, but is extended to shaping the gas flow in laser gyros using different configuration. The invention provides for the shaping of the gas flow in order to control the interaction of the counter-propagating beams with the moving gain medium and thus produce a predetermined Fresnel-Fizeau drag.

BRIEF DESCRIPTION OF THE DRAWINGS

The present invention may be better understood with reference to the accompanying drawings wherein:

FIG. 5 shows the parametric family of curves illustrating the effect of varying the amount of bypass on the Fresnel-Fizeau v. discharge current relationship.

DESCRIPTION OF THE PREFERRED EMBODIMENT

Figures 1, 2:
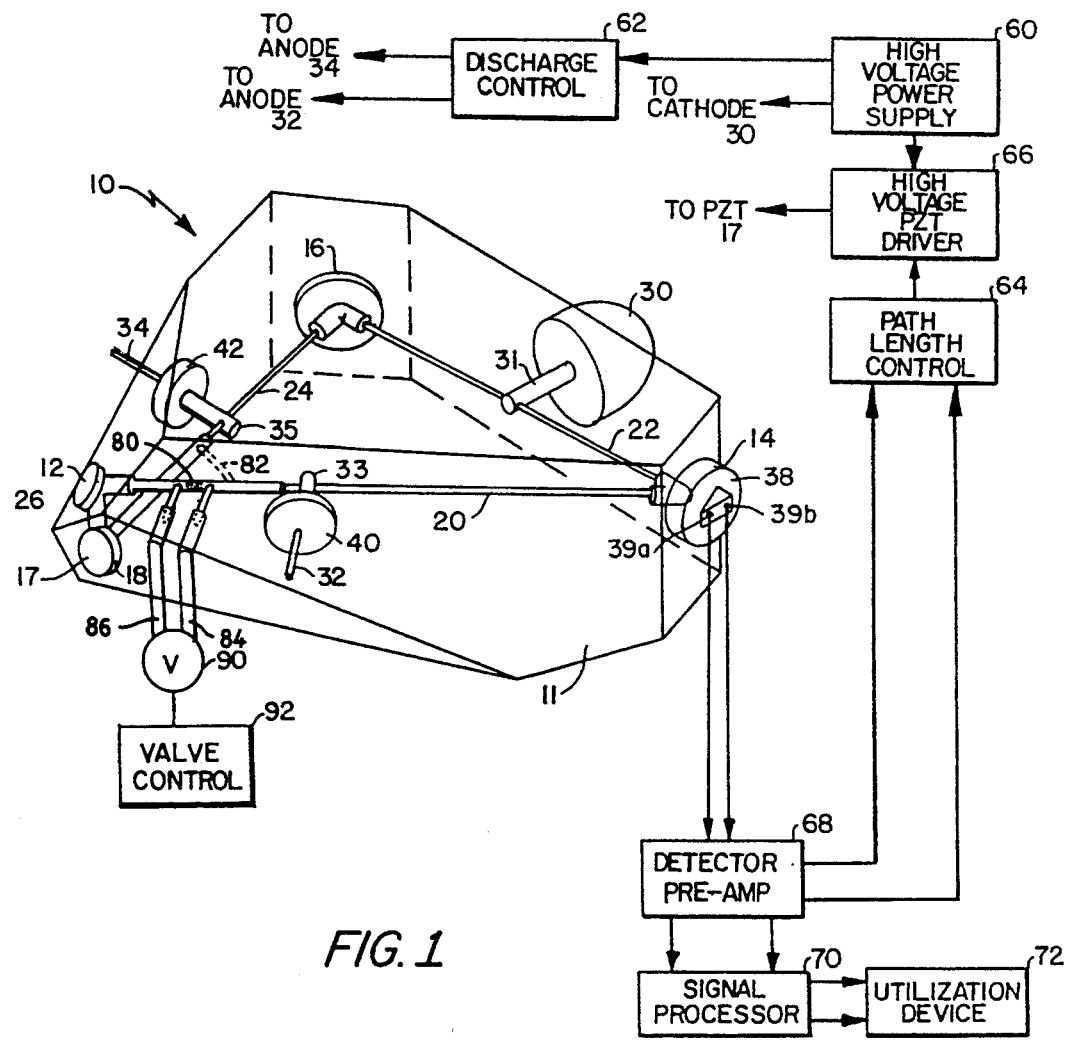
FIG. 1 is a partially diagrammatical view of the laser gyro system of the present invention.
FIG. 2 shows the mode component distribution useful in understanding the operation of the laser gyro of the present invention.

Referring now to FIG. 1, there is shown the ring laser gyro system embodying the principles of the present invention. A ring path is produced in block 11 by mirrors 12, 14, 16 and 18 placed at respective surfaces of block 11. Passages 20, 22, 24 and 26 are cut into block 11 between mirrors 12, 14, 16 and 18 to provide a clear path and contain a gain medium suitable for producing beams of predetermined frequency. Valve 90 is set to a position which produces an optimized amount of Fresnel-Fizeau drag, as will be explained in more detail hereinbelow. Beams of electromagnetic energy propagating in the path thus defined are produced by generating an electrical discharge in the gain medium, as is well known in the art. Such a discharge is produced between central cathode 30 and electrodes 32 and 34 by high voltage power supply 60 and discharge control 62. In the preferred embodiment, the mirrors are positioned to produce a ring path having path segments in two intersecting planes. The resulting nonplanar resonant path produces an image rotation sufficient to provide a predetermined amount of reciprocal (direction-independent) circular birefringence to the beams circulating in such path. This forces the beams to be circularly polarized and to separate in frequency according to their polarization sense. This may be seen in FIG. 2 as the frequency splitting of a predetermined mode of frequency $f_c$ into a first component pair, comprising counter-propagating left-hand circularly polarized (LCP) frequency components $f_1$ and $f_2$, and a second component pair, comprising counter-propagating right-hand circularly polarized (RCP) frequency components $f_3$ and $f_4$. A more detailed description of such a circularly polarized gyro using a nonplanar path is found in U.S. Pat. No. 4,110,045 issued Aug. 29, 1978 to Smith, Jr. et al and assigned to the present assignee. A nonreciprocal (direction-dependent) polarization rotation is provided by Faraday rotator 80, which is used to provide a frequency splitting, usually called Faraday bias, between counter-propagating components for each pair, i.e. between $f_1$ and $f_2$ of the LCP pair, and $f_3$ and $f_4$ of the RCP pair. Faraday rotator 80 comprises a plate of optical material and means, such as a permanent magnet, for producing a longitudinal magnetic field in the optical material. A more detailed description of a suitable Faraday rotator may be found in U.S. Pat. No. 4,284,329, issued to Aug. 18, 1981, to Irl W. Smith et al., and assigned to the present assignee.

One of the mirrors, for instance mirror 14, is made partially transmitting in order to extract the beams circulating in the ring path. Output optics 38 is formed on output mirror 14 and is used to combine the counter-propagating mode components and isolate each polarization on separate diodes, here shown as diodes 39a and 39b, in order to detect the beat frequencies between the counter-propagating mode components for each polarization, i.e. ($f_2$–$f_1$) and ($f_4$–$f_3$). The two resulting signals are preamplified in preamp 68 before being fed to signal processor 70 where an output signal indicative of the rotation rate is generated, for instance, by subtracting one beat frequency from the other to remove the Faraday bias. The output signal thus generated is then coupled to utilization device 72 which may include a visual display or other operator interface. A more detailed description of suitable output optics 50 may be found in U.S. Pat. No. 4,141,651, issued Feb. 27, 1979 to Smith et al. and assigned to the present assignee.

The pathlength control feedback network uses the DC signal components available at preamplifier 68, which indicate the relative intensities of the circularly polarized mode components pairs. These DC signals are coupled to pathlengh control 64 which produces an appropriate error signal as a function of the difference of their relative intensities. This is done to maintain the mode components corresponding to the two circularly polarized pairs, i.e. $f_1$ and $f_2$ for the LCP pair and $f_3$ and $f_4$ for the RCP pair, symmetrically within the bandwidth of the gain medium. The error signal produced by pathlength control 64 is then applied to piezoelectric driver 66 to produce a voltage signal which is applied to piezoelectric actuator 17. The voltage applied causes a corresponding contraction or expansion of the piezoelectric substrate, thus moving surfaces of mirror 18 in a direction which compensates for a contraction or expansion of the block circumference. A more detailed description of such a pathlength control is found in U.S. Pat. No. 4,108,553 issued Aug. 22, 1978, to Zampiello et al. and assigned to the present assignee.

Cathode 30 comprises a substantially spherical conductive envelope of a material suitable for the generation of free electrons. Cathode 30 is hermetically sealed to the center of one of the faces of block 11 adjacent passage 22. Cathode 30 is coupled to the ring path through auxiliary passage 31 which is drilled to intersect passage 22.

Anodes 32 and 34 each comprise a conductive electrode coupled to the ring path through auxiliary passages 33 and 35, respectively, drilled to intersect passages 20 and 24. The ends of electrodes 32 and 34 do not intersect passages 20 and 24, and stop a short distance therefrom. Electrodes 32 and 34 are held in place by seals 40 and 42 which prevent gain medium leakage.

The diameter of the inactive region of the passages, that is, the portion of passages 20, 24 and 26 between electrodes 32 and 34 on the opposite side from cathode 30, is of a size larger than the diameter of the active region, that is the portion of passages between the two electrodes 32 and 34 and cathode 30, to ease manufacturing tolerances and to reduce diffraction losses of the circulating beams.

Figure 3:
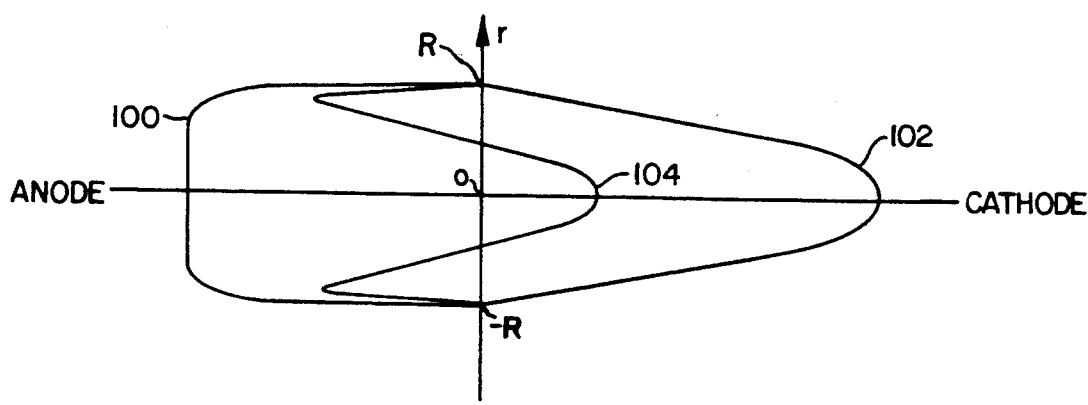
FIG. 3 shows the various gas flow velocity distributions as a function of radial position in the laser gyro tube between the anode and cathode.

The electric DC discharge used to produce the counter-propagating beams gives rise to the so-called Langmuir flow. This is shown in FIG. 3 as line 100. It may be explained as follows. In a Helium-Neon discharge, a small positive Neon-ion flow and a larger electron flow, which is due to the greater electron mobility, support the electric current. In the central region of the discharge passage, these forces on the gain medium are in equilibrium, and thus there is no net flow of the gas. The balance of forces no longer applies in the region near the wall of the discharge passage. In this region, the ions collide with the negatively charged wall, transferring all of their energy, while the electrons predominantly scatter elastically off the surface. Thus, in a sheath of thickness of the order of one ionic mean free path (MFP) at the wall, the unbalanced electron pressure exerts a net force on the atoms of the gas which drives a neutral gas flow from cathode to anode. The resulting flat top profile due to the wall effect is shown as line 100 in FIG. 3.

In the ring path of the gyro shown in FIG. 1, Faraday rotator plate 80 effectively blocks the passage, thus there cannot be any net gas circulation. This is similar to the case of a closed tube, and thus the wall effect leads to an increased gas pressure at the anode which induces a parabolic backflow from anode to cathode as indicated in FIG. 3 by line 102. The interaction of these two flows, i.e. their addition, results in the actual net flow, shown as line 104, in FIG. 3. Thus, the counter-propagating beams, normally travelling along the central portion of passages 20, 22, 24 and 26, interact with a moving medium. This causes the beam travelling in the direction of the flow to see a first optical length, while the beam travelling in the direction opposite of the flow sees a second, and different, optical length. There is then a frequency shift between counter-propagating beam components which is a function of the gas flow pattern. This frequency difference is detected and contributes a component, here called Fresnel-Frizeau drag bias, to the beat signal used as the rotation rate indicating signal.

As discussed in the Background, attempts at removing this bias have focussed at providing a balanced discharge, in order to set-up equal and opposite flow patterns which would cancel. The problem has been that perfectly equal discharge paths and perfectly balanced current are expensive and difficult to achieve. However, it has been found that the gain medium flow can be controlled to optimize the Fresnel-Fizeau bias. This provides an additional degree of freedom in optimizing gyro bias.

The gyro of FIG. 1 is provided with an additional passage 82 which is located between passages 20 and 24 and is shown dotted in FIG. 1. Its purpose is to allow a bypass path for a portion of the gas flowing in the path, thus alleviating some of the back pressure generated on the cathode. This bypass opening has the effect of reducing the velocity profile depicted as line 102 in FIG. 3. This in turn decreases the velocity distribution of the resulting net flow, depicted by line 104, in the region close to the optic axis. Thus, the amount of gas bypass provided by auxiliary passage 82 can be adjusted and used to provide a predetermined net flow pattern which, in its interaction with the electromagnetic beam produced by a predetermined discharge, decreases the deleterious effect of the Fresnel-Fizeau drag on the gyro's output signal.

Figure 4:
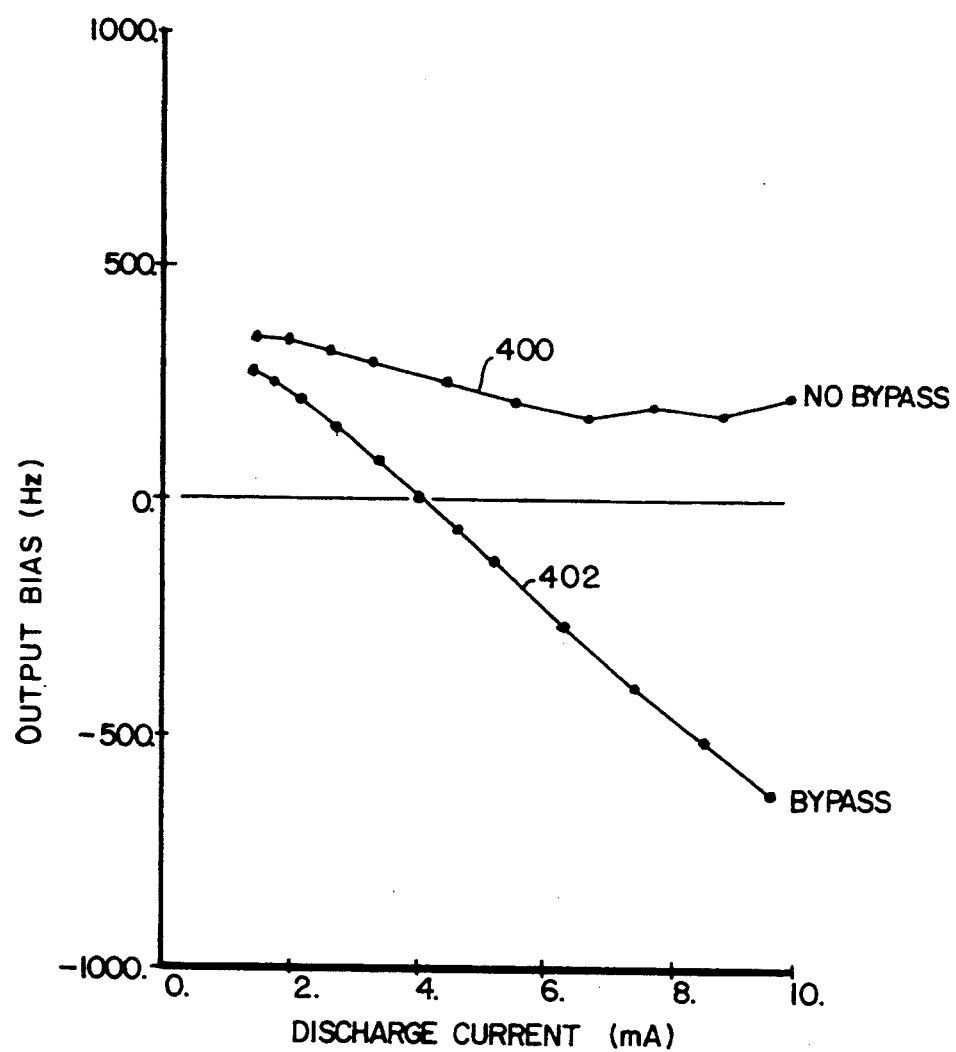
FIG. 4 shows a comparison of the bias v. current characteristics for a gyro using no bypass with those of a gyro which uses a bypass to control the gas flow.

Referring now to FIG. 4, there is shown the effect of running the gyro without bypass, that is, with auxiliary passage 82 blocked, and with bypass, that is, with auxiliary passage 82 open. This, and all subsequent data, are taken using only one of the two discharge legs, for example, by setting discharge control 62 to provide a current only to anode 32. This mode of operation displays the greatest sensitivity to Fresnel-Fizeau drag, since it produces the most imbalance. Line 400 displays the output bias obtained for various values of discharge currents for the blocked bypass case. The same gyro is then operated with auxiliary passage 82 operational and the resulting output bias v. discharge characteristics are shown by line 402. The gas fill was a mixture having a ratio of Helium to Neon of 10:1. As can be seen from the two curves, the ouput bias changes when a gas bypass is provided. This is due to a change in the net gas flow profile seen by the circulating beams. Thus, a bypass can be used to advantageously control the gas flow.

To experimentally determine the effect of gas flow on the gyro bias, a laboratory test gyro analogous to the gyro of FIG. 1 was operated with a different type of bypass around Faraday rotator 80. This is implemented by providing two passages 84 and 86 on either side of Faraday rotator 80 and connecting them through a valve 90. Auxiliary passage 82 is now blocked. The opening and closing of valve 90 may be effected by valve control 92, if an electrically operated value is used, or manually. In any event, the size of the opening around Faraday rotator 80 can be set to any value. The relationship between Fresnel-Fizeau drag and discharge current was again determined for several positions of valve 90. A new family of parametric curves is then obtained showing how a change in the amount of bypass, affects the gyro bias component due to the Fresnel-Fizeau drag as a function of discharge current. These are shown in FIG. 5 for a gain medium composition having a ratio of Helium to Neon of 7.5:1.

It can be seen that the slope of bias v. current, db/dI, of the curves changes sign as a function of the opening size of valve 90. This, in turn, means that the gas flow can be shaped to achieve a predetermined relationship between output bias and discharge current.

The experimental data thus found, can be used in the gyro of FIG. 1 to improve the operation of the balanced split discharge. This is done in a first embodiment by selecting the zero-slope parametric curve to optimize the Fresnel-Fizeau bias component. In this case, the level of bypass used is that which corresponds, for a given gas composition, to the opening of valve 90 which results in a bias substantially independent of current. For example, referring now to FIG. 5, for a 7.5:1 gas fill, a value opening of approximately 0.4 is selected. It should be noted that the valve setting shown are only representative. The actual opening size is a function of the parameters of the block design, i.e. discharge bore diameter, and operating conditions, i.e. gas temperature, gas composition and discharge current; thus the actual opening size varies for different gyro design but it can be determined experimentally. Since the slope of the bias as a function of current is zero for this gas flow, variations in the discharge current will not change the bias, thus decreasing the tolerance requirement on the current supplied by discharge control 62.

In an alternate embodiment, the operation of the gyro system of FIG. 1 is improved by using a level of gas bypass for which the resulting gas flow, interacting with the beam produced by a predetermined discharge current, substantially eliminates the Fresnel-Fizeau bias. In this case, the Fresnel-Fizeau bias component is optimized by selecting one of the parametric curves with the zero bias intercept. For example, referring again to FIG. 5 for a gas fill having a ratio of 7.5:1, a valve setting of 1.2 is used for a discharge currrent of 6.5 mA. This allows operation of a single discharge leg with no resulting bias, thus saving the need for a balanced discharge.

It should be understood that selection of the gas bypass to optimize the bias v. current characteristics is not limited to the "closed tube" gas flow pattern resulting from the insertion of a Faraday rotator in the ring of a multiple oscillator type gyro described herein. The same gas flow pattern depicted by line 104 of FIG. 3 exists in the "open tube" gyro without a Faraday rotator, such as the present two-frequency gyros. In those cases, any orifice or aperture in the ring must be considered analogous to the bypass connection, although, without a Faraday rotator or other window, the aperture is now in the path of the beams. Thus, it is still possible to shape the gas flow, and thereby alter the Fresnel-Fizeau bias, by selecting the size of the orifice to generate parametric curves similar to those of FIG. 5.

Modifications to the described embodiments will be apparent to persons skilled in the art without departing from the spirit and scope of this invention. Accordingly, it is intended that this invention be not limited except as defined by the appended claims.

What is claimed is:

1. A method of operating a ring laser gyro, wherein a discharge current is used in a gain medium to produce a beam of electromagnetic energy and an output signal is produced in response to rotation of the ring, the interaction of the beam with said discharge producing a bias component in said output signal, comprising the steps of:

providing a bypass path in said ring; and
   controlling the flow of the gain medium through said ring and said bypass path to substantially eliminate said bias component due to the interaction of said beam with a predetermined level of said discharge current.

2. A method of operating a ring laser gyro, wherein a discharge current is used in a gain medium to produce a beam of electromagnetic energy and an output signal is produced in response to rotation of the ring, the interaction of the beam with said discharge current producing a bias component in said output signal, such bias component nominally varying with variations in said discharge current, comprising the steps of:

providing a bypass path in said ring; and
   controlling the flow of the gain medium through said ring and said bypass path to produce a bias component substantially invariant with respect to variations in the discharge current.

3. In combination:

means for providing a resonator, said resonator comprising a ring path and a bypass path in said ring path;
   means for providing a beam of electromagnetic energy comprising a gain medium in said resonator and means for providing a discharge current in said gain medium, the interaction of said beam with said discharge producing a frequency difference between counter-propagating beam components; and
   means for producing a gain medium flow through said ring path and said bypass path which substantially eliminates said frequency difference for a predetermined discharge current.

4. In combination:

means for providing a resonator, said resonator comprising a ring path and a bypass path in said ring path;

means for producing a beam of electromagnetic energy comprising a gain medium in said resonator and means for providing a discharge current in said gain medium, the interaction of said beam with said discharge producing a frequency difference between counter-propagating beam components, the amount of such produced frequency difference nominally being a function of the discharge current; and means for producing a predetermined gain medium flow through said ring path and said bypass path selected to maintain the amount of said frequency difference substantially constant over a predetermined range of the discharge current.

5. A ring laser gyro comprising:

means for producing a predetermined ring path having a bypass path;

means for producing counter-propagating beams in said path, such beam producing means comprising: a gain medium; and, means for generating a predetermined electrical current in said medium producing a gain medium flow;

means, responsive to rotation of the ring path, for producing an output signal having a bias component, interaction between the counter-propagating beams and the electrical current producing said bias component in said output signal; and means for controlling the gain medium flow in said path and said bypass path substantially eliminating said bias component for said predetermined electrical current in said gain medium.

6. The ring laser gyro of claim 5 wherein said current generating means produces a predetermined level of current distribution.

7. The ring laser gyro of claim 5 wherein said current generating means produces a balanced current distribution in said path.

8. A ring laser gyro comprising:

means for producing a predetermined ring path having a bypass path;

means for producing counter-propagating beams in said path comprising a gain medium and means for generating a predetermined electrical current in said medium;

means for producing an output signal indicative of rotation of said ring path, said output signal having a bias component due to the interaction of said beam with said discharge current, said bias component nominally varying with variations in said predetermined electrical current; and means for providing a gain medium flow in said path and said bypass path, said flow being controlled to maintain said bias component substantially constant substantially independent of variations of said current.

9. A ring laser gyro comprising:

means for producing a predetermined ring path having a bypass path;

means for producing counter-propagating beams in said path comprising a gain medium and means for generating an electrical current in said path;

means for producing an output signal in response to rotation of said ring path, the interaction of said beams with said current producing a bias component in said output signal; and means for providing a gain medium flow in said path and said bypass path, said flow being controlled to substantially eliminate said bias component at a predetermined level of said electrical current.

* * * * *